Figure 1:
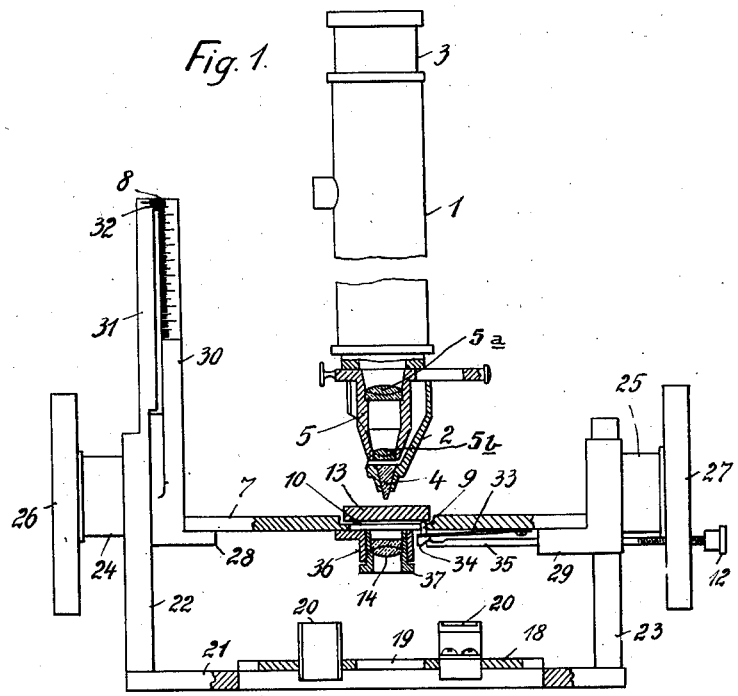

July 26, 1932.  H. W. LINDLEY  1,868,908
MICROSCOPE REFRACTOMETER
Filed April 10, 1930  4 Sheets-Sheet 1

Inventor:
Henry W. Lindley
by
Atty.

July 26, 1932. H. W. LINDLEY 1,868,908
MICROSCOPE REFRACTOMETER
Filed April 10, 1930 4 Sheets-Sheet 2
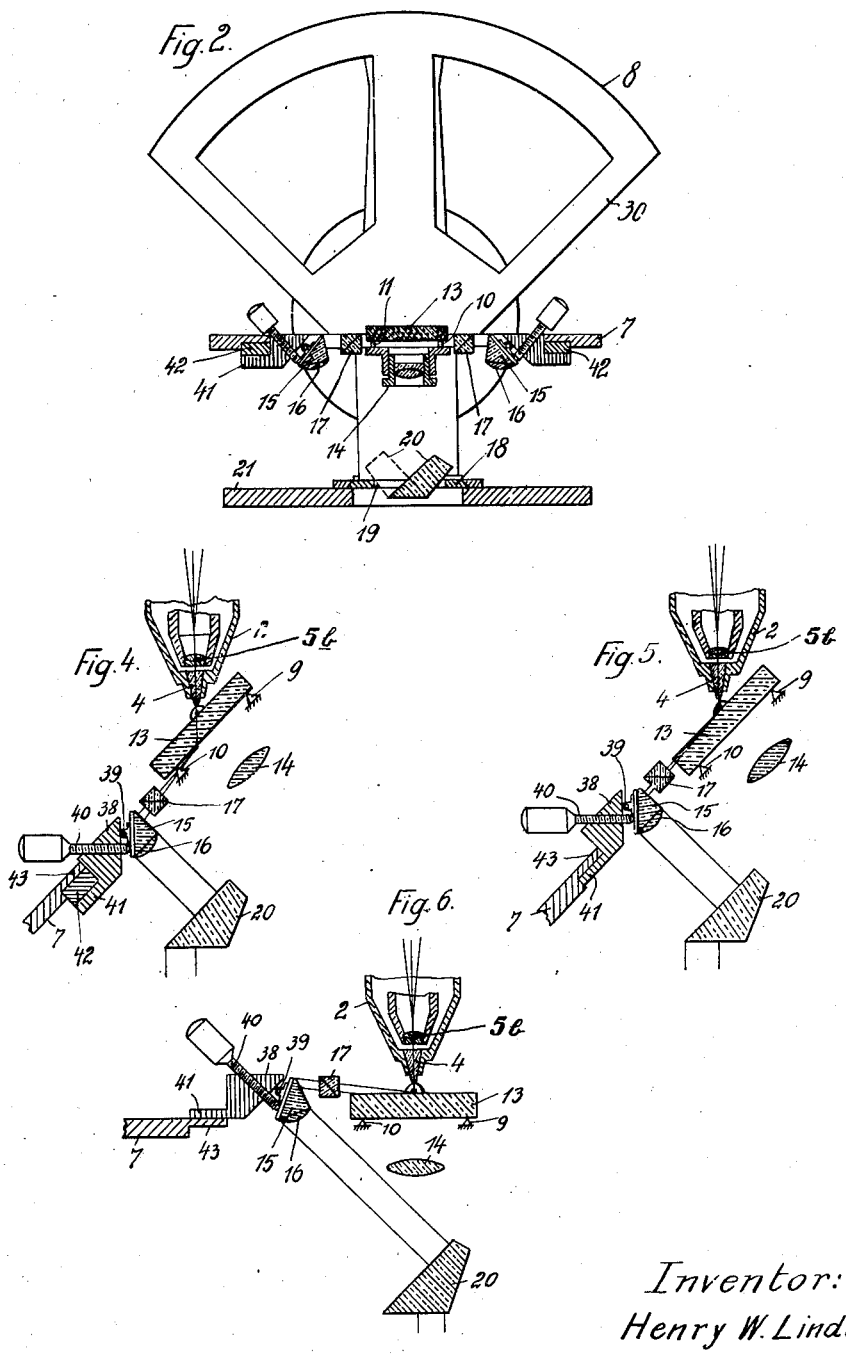
Inventor:
Henry W. Lindley
by Kartikechary
Atty.

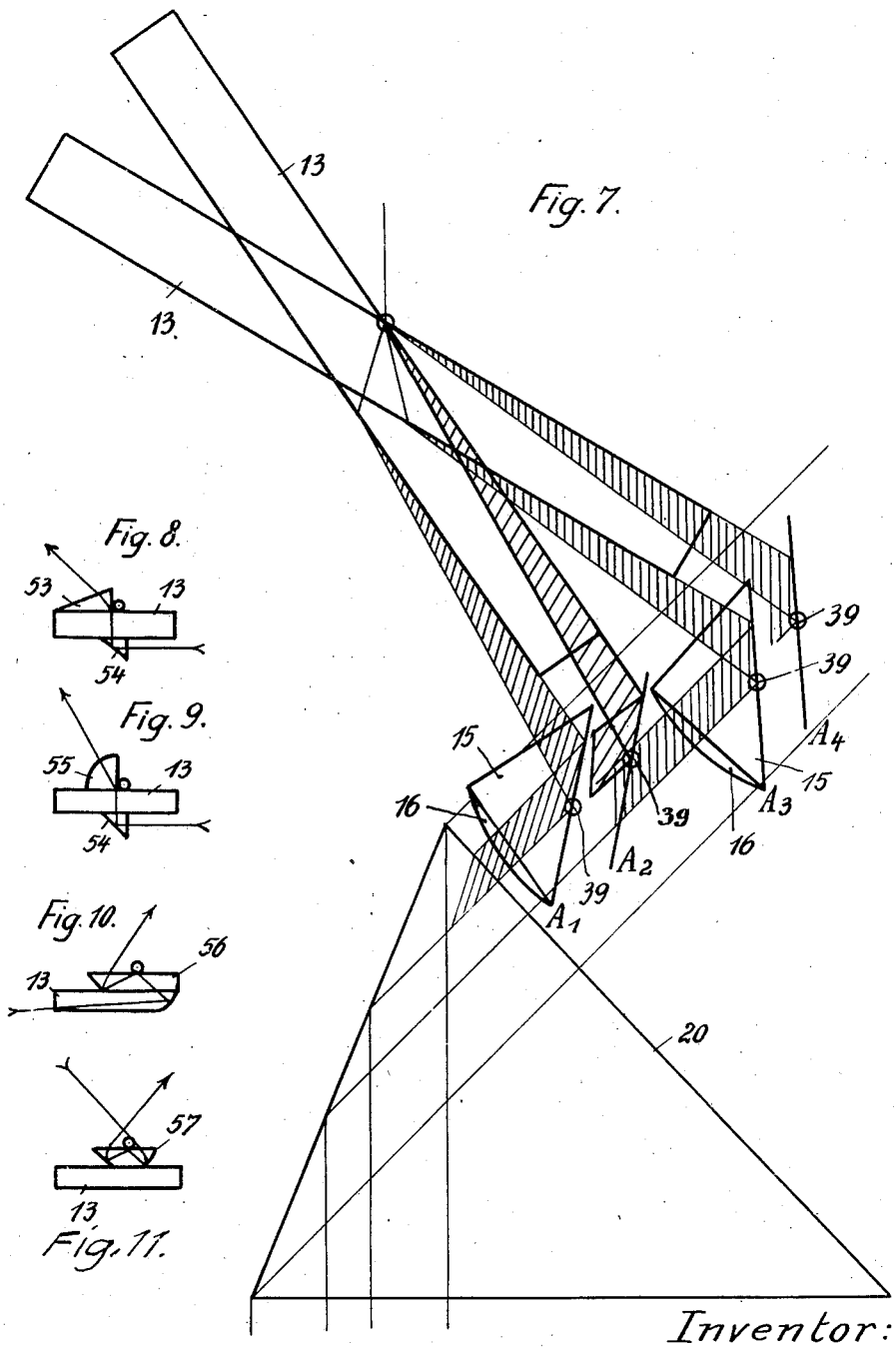

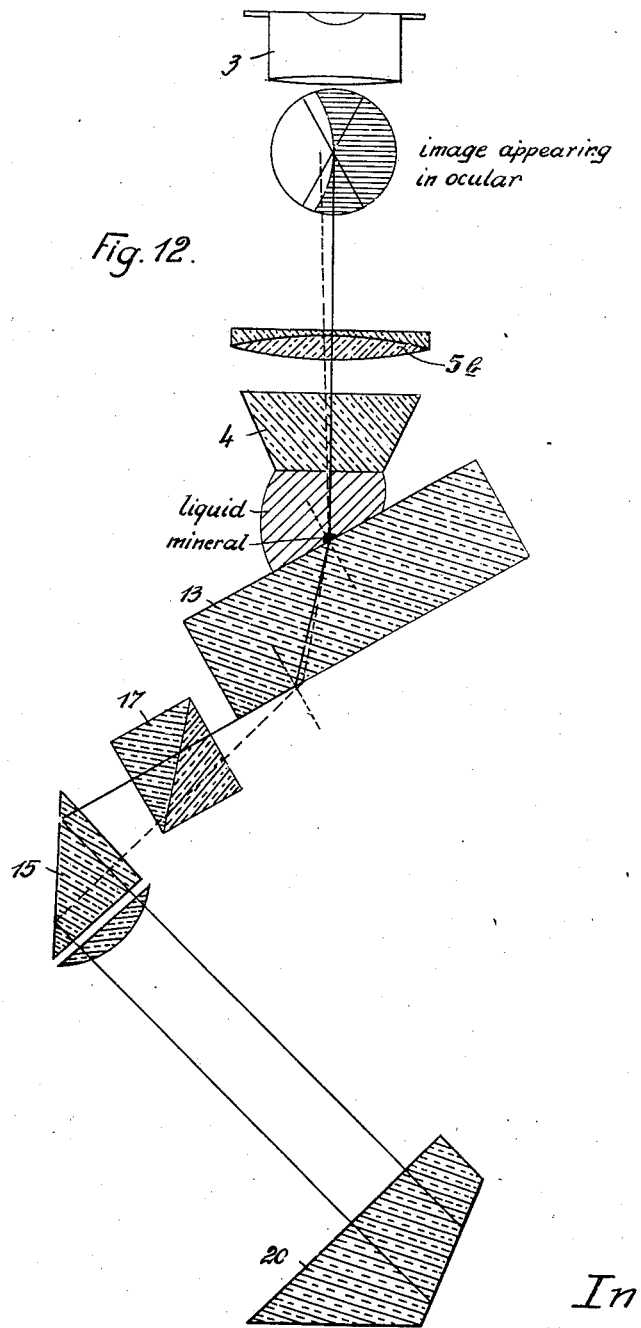

Patented July 26, 1932

1,868,908

UNITED STATES PATENT OFFICE

HENRY WILLIAM LINDLEY, OF BERLIN-LICHTERFELDE, GERMANY

MICROSCOPE REFRACTOMETER

Application filed April 10, 1930, Serial No. 443,232, and in Germany April 16, 1929.

My invention relates to a microscope refractometer which is particularly designed for analyzing minerals or for measuring the refractive power of other solid or liquid substances.

Heretofore measurements of the kind described were performed on comparatively large solids or liquids in accordance with the method of minimum deflection which, for instance, was applied to prisms on a goniometer, or, analogous with the method of total reflection, the light reflected at the border between the thicker and thinner media was utilized for the measurements. For comparatively thin optical media and comparatively large bodies a method in which tangent light rays were employed, and cubes or rotary hemispheres and the like of glass were the checks, was quite successful, but for small minerals and thin liquid layers the several methods and apparatus referred to were not suitable, and attempts to provide more suitable methods for these conditions have failed. For instance, C. Klein suggested adding to a crystal refractometer a slightly magnifying microscope equipped with diaphragms for grains of mineral substances which were ground thin, covered, and finally polished. The same scientist attempted to improve the microscope refractometer which Wallerand designed on the principle of Liebisch-Wollaston, but both attempts failed as the instruments could not be used for small particles on account of the tedious and difficult grinding operation. Fedorow's universal table, adapted to refractometric measurements, had the same drawback. Furthermore, in these apparatus, as in most other refractometers, the upper limit of the light refraction to be measured is that of glass, and the accuracy of the angle measurements is not sufficient.

Measurements have been made by a microscope for overcoming these drawbacks. However, in the microscope direct measuring of the refracting index of a mineral grain is unfavorably influenced by the fact that it is not possible to vary the normal passage of rays of the microscope to the extent required.

Therefore at present the indirect method has been universally adopted in which the refraction of the mineral is compared with that of another substance. As a rule the mineral is powdered and embedded in a liquid or a melt, the refracting index of which is determined separately. The methods of Schroeder van der Kolk and Becke come under this heading. Schroeder has demonstrated that it is possible to find out whether the refraction index of the mineral grain is higher or lower than that of the liquids by laterally diaphragming the passage of the rays in the microscope. The same result was attained by Becke by raising and lowering the microscope tube.

If the requirements as to accuracy of measurement are not too exacting, the ratio of the refraction index to be ascertained may be compared with a standardized system of liquids, but for higher degrees of accuracy this method is not sufficient. Intermediate values are obtained by mixing liquids having various refracting powers, and by using liquids the refraction index of which may be varied as desired. In this manner, three decimals of the refraction index are obtained as a rule. However, this method involves the drawback that the constancy of the refractive power of the liquid as observed in the microscope, and as used for the method in the refractometer, cannot be relied on. Emmons has suggested to eliminate this difficulty by using the same liquid in the microscope and in the refractometer and to bring it to equal temperatures in both apparatus at the same time by circulating water.

It is an object of my invention to eliminate all the difficulties of the existing apparatus and measuring methods. My invention is based on the embedding method and by my invention the range within which measurements can be made is widened to such an extent that even the smallest particles, for instance, particles which form upon the separation of the constituents of minerals by their specific gravity, can be measured at a single station and without preliminary preparation.

In reducing my invention to practice I provide a refractometer table which is equipped with adjustable illuminating prisms for projecting light onto the sample or its support, in combination with Nicol prisms. I further provide a normal petrographic microscope and combine with this microscope an objective having several members which may be removed as desired, with or without a plunger.

In this apparatus I may employ the normal passage of the rays as in a microscope but I may also employ a passage of rays instead, which is materially different from this normal passage, by projecting the light from the microscope mirror in grazing relation with respect to the sample by means of the illuminating prisms. In this manner a passage of rays is obtained which corresponds substantially to the passage of rays in a partially illuminated dark field, with the possibility of varying the angle with respect to the axis of the microscope by tilting the micrometer table. Another improvement effected by my invention is the possibility of using linear polarized light by a Nicol prism.

In refractometring according to my invention the passage of the light rays is similar to that in a refractometer with a variable refracting angle. As the position of the microscope axis with respect to the microscope table is fixed, I provide a refractometer table which, together with the illuminating prisms, is adapted to be inclined with respect to the axis of the microscope. The table is tilted in either direction about a horizontal axis and its inclination may be measured exactly to minutes of an arc. The light is admitted in grazing incidence at the lower side of the plane-parallel object support, and when the telescope unit of the microscope is adjusted to the border of the light and dark fields, the refracting prism angle of the liquid between the support and the front face of the immersion body as the objective corresponds to the angle of total reflection of the liquid. In refractometring liquids or melts of high refraction index the light is admitted to the upper face of the support in grazing incidence.

With an instrument designed according to my invention microscopic methods based on the embedding method and the subsequent determination of the refraction index of the embedded medium may be performed with the same instrument which is particularly advantageous when the indexes to be measured are high.

A further advantage of my novel instrument is that it is not limited to the normal passage of rays in the microscope, but that in contradistinction to what was accomplished before it is possible to operate with linear polarized bundles of rays at any desired angle to the axis of the microscope, with or without tilting the refractometer table. In this manner it is possible to establish the most favorable optical conditions for a given case, for instance, rendering visible the finest inclusions etc., resulting in much increased accuracy.

The elimination of glass bodies between the objective and the sample facilitates the operation of the instrument and permits higher rates of magnification. Testing granular substances is rendered possible by my novel instrument, and it is even practicable to operate by the embedding method with an uncovered, thin-ground section on the support, at the same time determining the light refraction of the liquid. The error due to the lack of planeness of the sample support may be eliminated by checking, inclining the refractometer table to the front or the rear and operating an adjusting screw. In this manner it is possible to test still more accurately very small percentages of minerals which are included in rocks.

By providing a plane-parallel plate as the object support, with grazing light incidence at the lower face of the support, tedious calculation of values is eliminated, as it is eliminated in the refractometer with variable refracting angle. The angular values ascertained by the instrument yield the index to be read in the table independently of the temperature and the wave length of the light with which the instrument has been operated.

In the drawings affixed to this specification and forming part thereof a refractometer embodying my invention is illustrated diagrammatically by way of example, with diagrams illustrating its operation, and some details.

In the drawings

Figure 3:
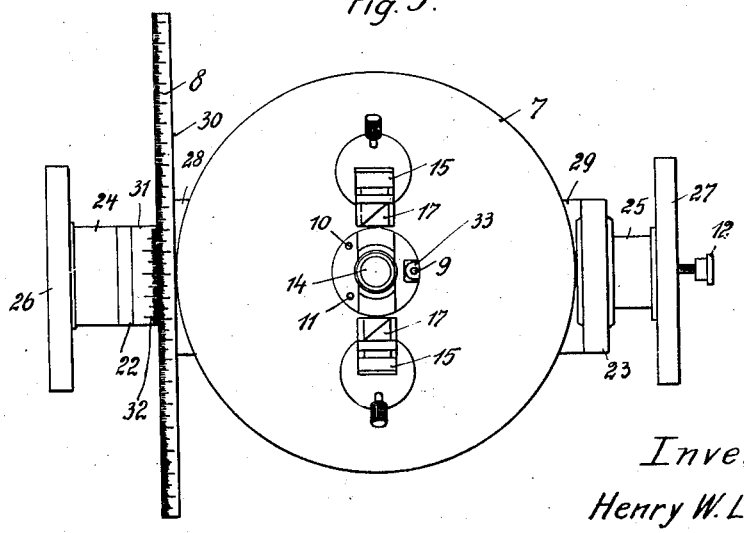

Fig. 1 is an elevation of the instrument, partly in section on the axis about which the refractometer table is tilted, Fig. 2 is a section on the line II—II in Fig. 1, with the microscope omitted, Fig. 3 is a plan view of the instrument showing the refractometer table, with the microscope also omitted, Figs. 4–6 are diagrams illustrating the passage of the rays in various relative positions of the refractometer table and the microscope, Fig. 7 illustrates the passage of the light rays for various embedding media, Figs. 8–11 illustrate various types of object supports, and Fig. 12 is another diagram, drawn to a larger scale, of the passage of the rays.

Referring now to the drawings and first to Figs. 1–3, 1 is a normal microscope which, however, is equipped with a novel objective 2, and a refractometer table 7. Preferable an ocular 3 is provided for adjusting which is different from the normal microscope ocular, for instance, a Ramsden ocular with autocollimation appliance, by providing which I attain the advantage that the hair cross remains in adjusted position when the ocular magnification is varied.

The objective 2 consists of several units and is equipped with a conical or cylindrical plunger 4. 5 is an inner unit comprising a top lens 5a and bottom lens 5b. Any number of such units may be provided. By removing the top lens 5a of this unit the objective becomes a telescope objective while with all its lenses it is a microscope objective. In particular cases the plunger may be dispensed with. The telescope objective is held in a given position for maintaining the adjustment. If a plunger is used a prism of liquid is formed between the end face of the plunger which face is at right angles to the axis of the microscope, and the surface of the object support 13.

21 is the miscroscope table which is provided with a pair of uprights 22 and 23. 24 and 25 are trunnions with handles 26 and 27 which are mounted to rotate in the uprights 22 and 23 and are equipped with brackets 28 and 29 for supporting a refractometer table 7. The bracket 28 is provided with an extension 30 and the upright 22 is provided with an extension 31. 8 is a scale on the edge of the extension 30, and 32 is a shorter scale on the edge of the extension 31 by which the angular position of the refractometer table 7 is indicated. Any suitable means, not shown, for instance a micrometer screw, may be provided for adjusting the table 7 with respect to the table 1. 9, 10 and 11 are adjusting pins for the object support 13 on the refractometer table 7, means being provided for displacing one of them. In the present instance the means include a spring 33 at the lower face of the refractometer table 7 which supports the pin 9, a cam 34 on the spring, and a push bar 35 the outer end of which is threaded and inserted in a tapped hole of the bracket 3. 12 is a handle which is secured on the end of the push bar 35, its end projecting through a hole in the hand wheel 27.

The object support 13 is preferably ground plane-parallel to the required thickness. 37 is a tube which is fitted to slide in a tubular bracket 36 below the table 7, and 14 is a condenser lens or spherical sector in the tube 14. 15, 15 are two prisms pitched at either side of the axis about which the refractometer table 7 is tilted, 16 are cylindrical lenses on the inner faces of the prisms, 38 are brackets on which the prisms are fitted to rock about the pivots 39, 40 are screws with handles which are inserted in the brackets 38 and serve for rocking the prisms about their pivots 39. 41 are flanges at the outer ends of the prisms by which they may be secured to the table 7, and 42 are jibs which are inserted between the flanges 41 and a flange 43 of the table for certain relative positions of the bracket and the table. 17 are Nicol prisms which are combined with the prisms 15.

Figs. 4 and 5 illustrate the relative position of the parts when the table 7 has been tilted through a certain angle, showing one of the prisms 15, 16 only, with the brackets 38 on the table 7 in which the jibs 42 are inserted between the flanges 41 and 43 in Fig. 4, and removed in Fig. 5. In the position Fig. 4 the rays pass in grazing relation with respect to the lower face of the support 13. Referring to Fig. 5, the jib 42 has been removed and the flanges 41 and 43 are in direct contact. This raises the position of the prisms 15 with respect to the support 13 so that the rays now pass in grazing relation with respect to the upper face of the support 13. Referring to Fig. 6, the brackets 38 are placed with their flanges 41 on top of the flanges 43 and the rays now pass at an angle through the upper face of the support 13.

The prisms are illuminated by means of a system which is arranged on a slide 18 on the table 21. 20 are two prisms on the slide 18, and 19 is a central opening in the slide for the light rays to pass through. The illuminating prisms 20 are preferably provided with reflecting layers and are so designed that the light which is reflected from the microscope mirror, not shown, in vertical direction from below, is reflected to the prisms 15. The prisms 15 may be equipped with reflecting surfaces, or may be without them.

In operation, the object to be tested, for instance, a powdered mineral substance, is embedded in a liquid the refraction index of which is approximately similar to that of the mineral substance, and other liquids are added to the first liquid, or the liquid is heated so as to adapt its index to that of the mineral substance. Differences in the indices are preferably rendered visible by arranging the parts as shown in Fig. 6. With this arrangement not only the accuracy upon comparison of the light refraction of the object and the liquid in which it is embedded is increased but it is also possible to localize more exactly than heretofore the position of inclusions, air-filled cracks, and the like. When the indices of the object and the liquid have been equalized, their value can be measured by passing over from the microscopic to the refractometric passage of rays, as illustrated in Fig. 12. To this end the bundle of rays coming from the microscope mirror are first directed onto the small illumination prism 15 by inserting the lower prism 20. From the prism 15 the light, having been made convergent by the lens 16, is directed in grazing incidence and under a small angle onto the bottom surface of the object support. If desired, the Nicol 17 may also be inserted. The light now enters the object support in accordance with the refraction index of the glass.

Of the rays meeting the bottom surface of the object support that one is particularly important, which meets it with grazing incidence; for according to the laws of light refraction the ray *a* passing from the optically thinner medium with grazing incidence onto the plane surface of the optically denser medium, is characterized thereby that it forms with the vertical on this surface the greatest possible angle α. This property is retained also after the light has emerged from the parallel top surface of the object support and has simultaneously entered the substance to be tested.

The limit angle β, which is here measured, indicates the angle of total reflexion of the substance to be tested and therefore also indirectly its refraction index.

In order to trace this angle, the refractometer table must be tilted until the border line spoken of above is reproduced in the crossed threads of the ocular by the lens system serving as telescope objective. On the scale 8 the angle of tilting of the table can now be read with the aid of the nonius 32 and from a schedule or monogram the corresponding refraction index. The position according to Fig. 4 with the light rays in grazing incidence on the lower face of the support 13, is selected for refraction indices below 1.9. For indices above 1.9 the position according to Fig. 5, with the rays tangent to the upper face of the support, is preferable but in this case the values read in the table must be multiplied with the refraction index of the glass which is a function of the light employed.

Referring now to Fig. 7, this illustrates the passage of the rays from one of the illuminated prisms through one of the prisms 15 with its cylindrical lens 16 to the support 13 for four refraction indices. In the positions $A_2$ and $A_4$ only the support of the prism, with its pivot 39, is illustrated as the showing of the prisms in these positions would have interfered with positions $A_1$ and $A_3$. Position $A_1$ corresponds to the index 1.22, the prism 15 being arranged below the table at an angle of 55 degrees. Position $A_2$ corresponds to the index 1.83, the prism being arranged above the table at the same angle. The positions $A_3$ and $A_4$ correspond to the indices 2 and 3, with the prism below and above the table, respectively, both at an angle of 30 degrees.

The image which appears in the telescope has the advantage of great intensity of the light-dark area at the limit of total reflection because it is not necessary to insert a diffusing, ground-glass plate as in other apparatus. Nor is it necessary to vary the position of the lamp for the several tests, as the variation of the passage of the light rays is effected exclusively in the instrument. Rotary means may be provided for combining with the measurements of the light refraction the very exact ascertaining of other important crystal factors, the measurements being effected in seconds of an arc. The possibilities of the instrument including goniometry, microgoniometry, investigation of etched sections and inclusions, and the range of the instrument is far beyond that of the mere combination of a microscope with a refractometer.

In connection with this test, and with the same instrument, the several principal refraction indices may be ascertained directly without troublesome calculations.

The possibilities of operating at great magnification and of observing a thin layer liquid below a covering glass are further advantages of my novel instrument.

For exact measurements within comparatively small ranges the types of object supports 13 illustrated by way of example in Figs. 8–11, or other suitable types, may be used. In these types the great measuring range of normal object supports is exchanged for a smaller range which affords a higher degree of accuracy. In this manner, I obtain special object supports for the refraction index of given minerals or groups of minerals, thus, for instance, a support for felspar, another for hornblende, pyroxenes, etc.

Examples of specialized object supports are illustrated in Figs. 8–11. In these supports, the limit of total reflection at the border of glass and liquid is utilized for measuring. To this end a body or bodies, of glass, is secured to the object support 13. As shown in Fig. 8 the reflecting border faces of the glass bodies 53 and 54 above and below the support 13 are at right angles. The drop of the liquid to be tested is placed in the angle between the vertical face of the upper body 53 and the upper face of the support 13, and the light rays arrive in parallel relation with respect to the lower face of the support 13.

Referring to Fig. 9, this shows a similar arrangement but with an upper body 55 which is bordered by a curve face instead of a flat face at its outer side, as in the body 53 of Fig. 8.

Referring now to Fig. 10 the bordering face of the glass body 56 extends in parallel relation with the upper face of the support 13 and the rays are reflected a single time after leaving border face, with the object of preventing trickling down of the liquid when the inclination of the object support becomes too large. As shown in Fig. 10, the body 56 is at one side of the support 13, with its outer edge curved. Fig. 11 illustrates a body 57, which is arranged in a substantially central position with respect to the support 13.

I wish it to be understood that I do not desire to be limited to the exact details of construction shown and described for obvious modifications will occur to a person skilled in the art.

I claim:

1. A microscope refractometer comprising an ocular and an optical system below and coaxial with said ocular, said optical system being composed of two lens systems, one of said lens systems remaining stationary during operation and forming with said ocular a telescope adjusted for infinitely, the other lens system being removable and forming with said stationary lens system and said ocular a microscope, a refractometer table tiltably arranged below said optical system, a scale member for measuring the tilting angle of said table, optical illuminating means associated with said table and means arranged to shape the liquid to be refractometered as required for refractometration.

2. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, optical illuminating means associated with said table and an immersion body between said microscope and said table.

3. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, optical illuminating means associated with said table and a solid transparent refracting body on said table shaped so as to form with the liquid to be refractometered a reflecting plane.

4. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, a prism associated with said table for illuminating the test object, means for varying the position of said prism relative to said table and means arranged to shape the liquid to be refractometered as required for refractometration.

5. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, a prism associated with said table for illuminating the test object, means for varying the position of said prism relative to said table, a lens combined with said prism and means arranged to shape the liquid to be refractometered as required for refractometration.

6. A microscope refractometer comprising an ocular and an optical system below and coaxial with said ocular, said optical system being composed of two lens systems, one of said lens systems remaining stationary during operating and forming with said ocular a telescope adjusted for infinity, the other lens system being removable and forming with said stationary lens system and said ocular a microscope, a refractometer table tiltably arranged below said optical system, a scale member for measuring the tilting angle of said table, a prism associated with said table for illuminating the test object, means for varying the position of said prism relative to said table, an analyzing Nicol prism inserted in the path of light rays between said reflecting prism and said microscope and means arranged to shape the liquid to be refractometered as required for refractometration.

7. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, an object support on said table, means extending beyond the outer edge of said table for adjusting said support, optical illuminating means associated with said table and means arranged to shape the liquid to be refractometered as required for refractometration.

8. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, optical illuminating means associated with said table, a spherical sector of transparent material forming part of said illuminating means and fixed to said table and means arranged to shape the liquid to be refractometered as required for refractometration.

9. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, optical illuminating means associated with said table, an illuminating prism below said table forming part of said illuminating means and means arranged to shape the liquid to be refractometered as required for refractometration.

10. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, optical illuminating means associated with said table, a slide below said table having a central opening, two illuminating prisms on said slide and means arranged to shape the liquid to be refractometered as required for refractometration.

11. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, optical illuminating means associated with said table and a solid transparent refracting body on said table shaped so as to form with the liquid to be refractometered a reflecting plane, the border face of said refracting body extending at an angle to the plane of said table.

12. A microscope refractometer comprising an ocular and an optical system below and coaxial with said ocular, said optical system being composed of two lens systems, one of said lens systems remaining stationary during operation and forming with said ocular a telescope adjusted for infinity, the other lens system being removable and forming with said stationary lens system and said ocular a microscope, a refractometer table tiltably arranged below said optical system, a scale member for measuring the tilting angle of said table, optical illuminating means associated with said table and a solid transparent refracting body on said table shaped so as to form with the liquid to be refractometered a reflecting plane, the border face of said refracting body extending parallel with the plane of said table.

In testimony whereof I affix my signature.

HENRY WILLIAM LINDLEY.